(12) United States Patent
Woodell et al.

(10) Patent No.: US 6,388,608 B1
(45) Date of Patent: May 14, 2002

(54) METHOD AND SYSTEM FOR DETECTING TURBULENCE WITH REDUCED ERRORS RESULTING FROM VERTICAL SHEAR COMPONENTS

(75) Inventors: Daniel L. Woodell, Robins; Roy E. Robertson, Marion; Ying C. Lai, Hiawatha, all of IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/668,715

(22) Filed: Sep. 22, 2000

(51) Int. Cl.$^7$ ................................. G01S 13/95
(52) U.S. Cl. .................. 342/26; 342/74; 342/75; 342/93; 342/192; 342/195
(58) Field of Search ............... 342/26, 74–80, 342/158, 175, 88–93, 104, 109, 112, 118, 128, 129, 159, 192–197

(56) References Cited

U.S. PATENT DOCUMENTS 3,781,878 A * 12/1973 Kirkpatrick .............. 342/26
3,885,237 A * 5/1975 Kirkpatrick .............. 342/26
6,236,351 B1 * 5/2001 Conner et al. ............ 342/26

OTHER PUBLICATIONS

Co–pending patent application Docket No. 00CR092/KE entitled "Method And System For Suppressing Ground Clutter Returns On An Airborne Weather Radar" filed on an even date, inventor D. Woodell.

Co–pending patent application Docket No. 00CR093/KE entitled "Multi–Sweep Method And System For Detecting And Displaying Weather Information On A Weather Radar System" filed on an even date, inventor D. Woodell.

Co–pending patent application Docket No. 00CR218/KE entitled "Multi–Sweep Method And System For Mapping Terrain With A Weather Radar System" filed on an even date, inventor D. Woodell.

* cited by examiner

Primary Examiner—Bernarr E. Gregory
(74) Attorney, Agent, or Firm—Nathan O. Jensen; Kyle Eppele

(57) ABSTRACT

A system and method for enhancing turbulence detection, display and alerting with avionics weather radars which includes automatically making multiple scans, measuring a wind velocity gradient at varying elevations, and comparing the measured gradient to known predetermined wind velocity gradients over known elevation variations, wherein the predetermined gradients have known vertical shear components, and using a vertical shear component information in making determinations regarding the existence of turbulence.

20 Claims, 2 Drawing Sheets

METHOD AND SYSTEM FOR DETECTING TURBULENCE WITH REDUCED ERRORS RESULTING FROM VERTICAL SHEAR COMPONENTS

CROSS REFERENCE TO RELATED APPLICATIONS

This application relates to an application entitled "MULTI-SWEEP METHOD AND SYSTEM FOR DETECTING AND DISPLAYING WEATHER INFORMATION ON A WEATHER RADAR SYSTEM" by Daniel L. Woodell, filed Sep. 22, 2000, Ser. No. 09/668,674, and also relates to another application entitled "METHOD AND SYSTEM FOR SUPPRESSING GROUND CLUTTER RETURNS ON AN AIRBORNE WEATHER RADAR", filed Sep. 22, 2000, Ser. No. 09/668,656 and further relates to an application entitled "MULTI-SWEEP METHOD AND SYSTEM FOR MAPPING TERRAIN WITH A WEATHER RADAR SYSTEM", filed Sep. 22, 2000, Ser. No. 09/667,442, also by the same inventor, all filed on even date herewith and assigned to a common assignee, which applications are incorporated herein in their entirety by this reference.

FIELD OF THE INVENTION

The present invention generally relates to avionics, and more particularly relates to weather radars, and even more particularly relates to methods and systems for enhanced turbulence detection.

BACKGROUND OF THE INVENTION

Over the years, the tasks and results expected of a commercial airline pilot have increased. The cockpit of a typical modern commercial jetliner is much more elaborate with electronic navigation, communication, and control equipment, than that of an early commercial passenger aircraft. This equipment, in general, has proven to be quite beneficial. A prime example is the weather radar, which, among other things, is extremely helpful in detecting turbulence. However, these weather radar based turbulence detectors, which often use the existence of large standard deviations of wind velocities to indicate turbulence, have been plagued with the persistent problems of alerting the pilot to high turbulence levels when, in fact, the level of turbulence is relatively low.

To address these problems, typically, a pilot might adjust the threshold for alerting turbulence upward to reduce the number of false alarms.

While this attempt at reducing false alerts of turbulence has been used extensively in the past, it does have some drawbacks.

The primary drawback is that while raising the alert threshold does reduce the overall number of false alarms, it also reduces the number of legitimate and desired alarms as well. The pilot then has reduced ability to avoid relatively light to moderate turbulence.

Consequently, there exists a need for improved methods and systems for enhancing turbulence detection and alerting by airborne weather radars.

SUMMARY OF THE INVENTION

It is an object of the present invention to provide a system and method for enhancing the turbulence detection capability while suppressing the false alarm rate.

It is a feature of the present invention to remove from consideration by turbulence detection processes, portions of the detected radar returns which relate to vertical shear components of wind velocities.

It is a feature of the present invention to utilize a plurality of different geometrically oriented antenna scans.

It is another feature of the present invention to include a comparison of airborne measured average wind velocities gradients as a function of beam geometry and orientation (i.e. elevation), with known wind velocity gradients as a function of elevation, which known gradients have associated with them known vertical shear components.

It is an advantage of the present invention to achieve improved efficacy of turbulence detection using airborne weather radars.

The present invention is an apparatus and method for improving the quality of turbulence detection and alerting in avionics weather radars, which is designed to satisfy the aforementioned needs, provide the previously stated objects, include the above-listed features, and achieve the already articulated advantages. The present invention is carried out in a "mis-identification-less" manner in a sense that the mis-identification of vertical wind shear as turbulence has been greatly reduced. The present invention is also carried out in a "high alert threshold-less" manner in the sense that pilot alert threshold increases and their concomitant elimination of legitimate relatively low and moderate level turbulence alerts have been reduced.

Accordingly, the present invention is a system and method including multiple differently angled, weather radar scans and a computer comparison of average wind velocity elevation gradients from radar returns in relation to known average wind velocity elevation gradients having known vertical speed components.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
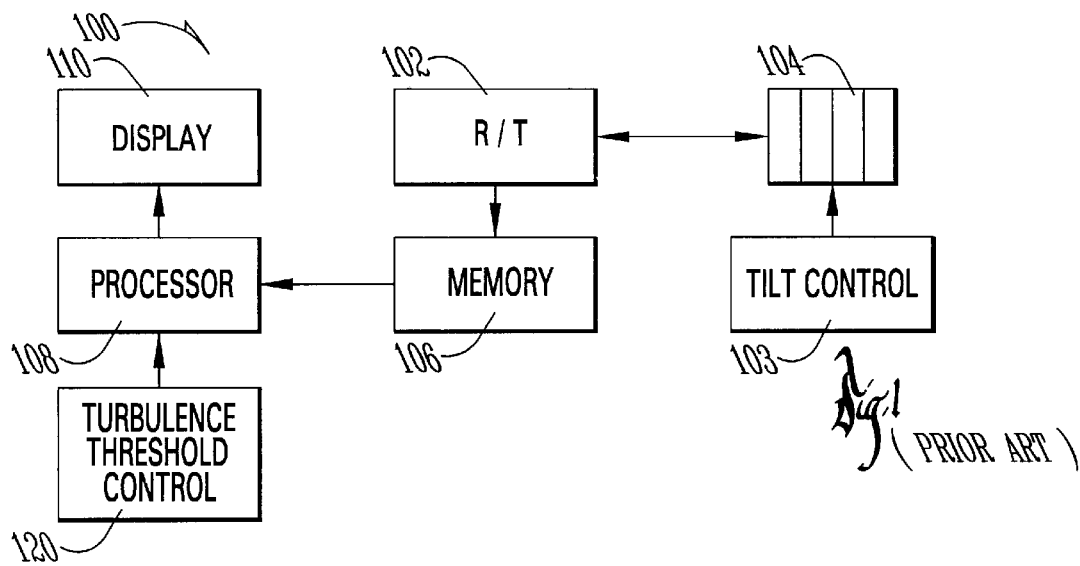
FIG. 1 is a simplified block diagram view of a weather radar/turbulence detection system of the prior art.

Now referring to the drawings wherein like numerals refer to like matter throughout, and more specifically referring to FIG. 1, there is shown a system of the prior art, generally designated 100, including a weather radar receiver/transmitter 102 coupled to a weather radar adjustable antenna 104. A manual antenna tilt control system 103 is included for manually controlling the tilt angle of the antenna by the pilot. This system is generally used by a pilot to manually adjust the tilt angle. In some prior art systems, the displays have been improved with an additional single scan smoothing memory 106, which is used to store one scan and limit the display of radically different data on the next sweep which is done at the same tilt angle. Weather radar return processing unit 108 is used to calculate standard deviations of wind velocities and to generate turbulence alerts when those standard deviations exceed limits which have been set by the pilot, as well as other well-known functions of an avionics weather radar system 100. Also shown is turbulence threshold control 120, which represents the control head or other device whereby the pilot provides input as to the threshold level of turbulence; i.e. the size of standard deviation of wind velocity vectors, which are required before a turbulence alert is given. The degree of integration of the components 102, 103, 104, 106, 108, 110 and 120 is a matter of designer's choice, and numerous prior art systems have many variations to those described above.

Figure 2:
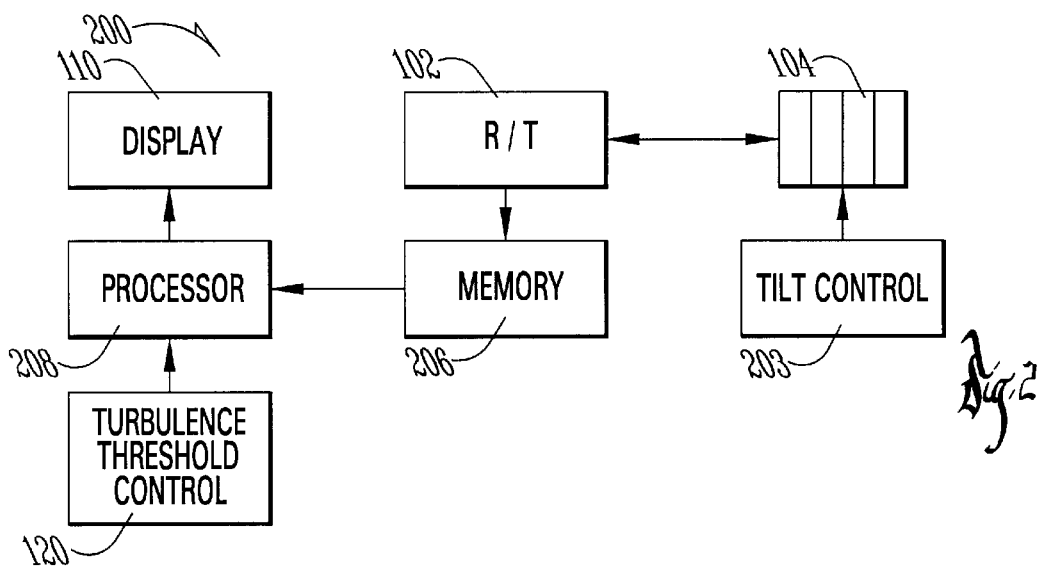
FIG. 2 is a simplified view of a block diagram view of a weather radar system of the present invention.

A detailed understanding of the present invention can be achieved by now referring to FIG. 2, which shows the avionics weather radar/turbulence detection, display and alerting system of the present invention, generally designated 200, having a weather radar receiver/transmitter 102, a weather radar adjustable antenna 104 and a multi-scan, multi-tilt angle, memory 206. Also included is a tilt control 203 for automatically controlling the tilt angle of the antenna 104; this auto control may include an additional manual control feature as well. This automatic tilt control 203 adjusts between antenna sweeps, the tilt angle of the antenna 104 by predetermined angles. This multi-scan, multi-tilt angle, memory 206 is believed to be new to the industry. Preferably, this memory is capable of storing in a readily addressable and rapidly retrievable manner, at least two, but preferably more, data sets resulting from two or more antenna sweeps at slightly different angles.

The data in multi-scan, multi-tilt angle, memory 206 is used to achieve the beneficial properties of the present invention. The multi-scan, multi-tilt angle, weather radar return processing unit 208 will perform the customary functions performed by weather radar return processing unit 108, plus it will perform several additional operations based upon the additional data available in multi-scan, multi-tilt angle, memory 206. In general, multi-scan, multi-tilt angle, weather radar return processing unit 208 will analyze the average wind velocities and the spectral width of returns associated with each scan. The standard deviation of wind velocity is a preferred statistic to use; however, it should be understood that any other statistic relating to the variations of wind velocities of the return could be used. The problem with the prior art approaches is that all of the variation in wind velocities is assumed to result in turbulence. However, this is not necessarily the case. Vertical shear components of wind velocities increase the variation and standard deviation of the samples, but do not necessarily result in turbulence. Consequently, the present invention uses the multi-scan approach to better determine the vertical shear component of wind velocities and to remove them from the data being used to predict turbulence.

The following simple equation clearly summarizes the impact of removal of vertical shear from the measured quantity.

$$\sigma^2(\text{measured}) = \sigma^2(\text{turbulence}) + \sigma^2(\text{shear})$$

If the $\sigma^2$ (shear) is removed from the measured standard deviations, then the resulting data is much more representative of the standard deviation attributable to turbulence.

The multi-scan approach is used to help determine average wind speeds at various tilt angle and, therefore, various elevations. A gradient of average wind speeds is generated. In general, the larger the gradient, or difference in wind speed at different tilt angles, the more vertical shear that is present. The processor 208 performs numerous functions, one of which is to develop this average wind gradient and to compare it to predetermined measured wind gradients. When an appropriate match is made, then the known vertical shear component of the predetermined wind velocity gradient is associated with the matching measured gradient. The vertical shear components are then removed from the measured velocities, and the resulting data, without vertical shear components, is used to determine turbulence.

It should also be noted that in areas having a certain high level of vertical shear, the air about these areas is often turbulent. Consequently, low and moderate levels of shear can be used to adjust the typical standard deviation test. However, if high levels of vertical shear are present in isolated areas nearby the projected flight path, then this fact alone will be used to trigger a turbulence alarm, irrespective of the measured standard deviation of the returns or of the standard deviation of the vertical shear adjusted returns.

Figure 3:
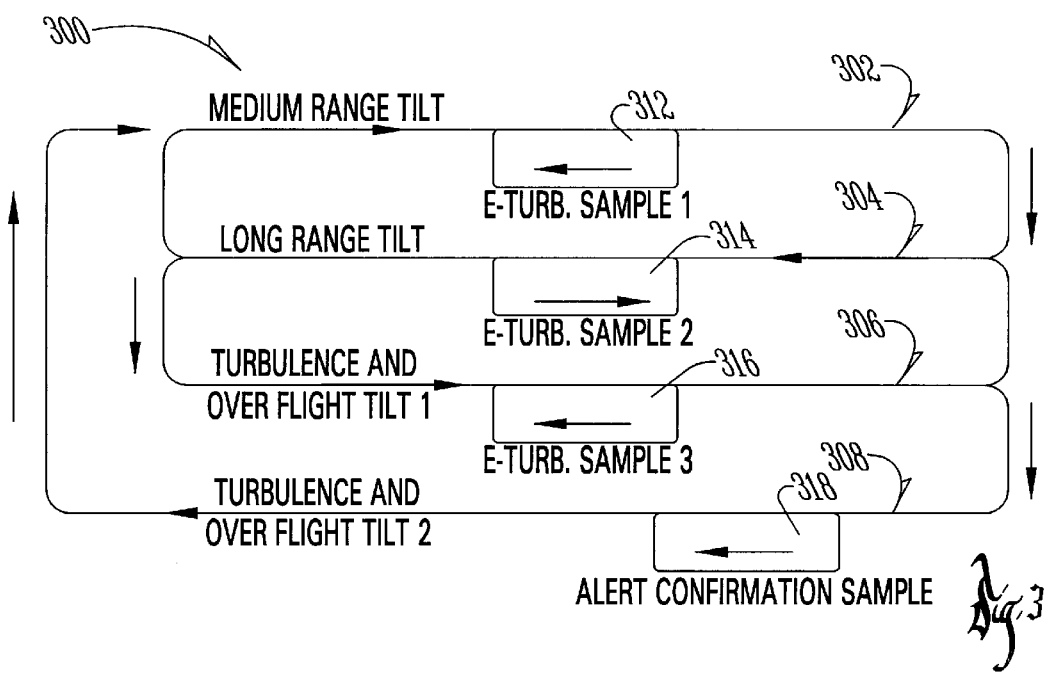
FIG. 3 is a simplified depiction of the relative relationships between various radar scans at differing tilt angles. The central boxes in each scan represent that segment of the full azimuth scan which is used for turbulence detection, and further represents areas in which localized rescanning for turbulence detection is available.

Now referring to FIG. 3, there is shown a simplified depiction of a representative multiple scan plan, generally designated 300. The centrally disposed boxes in the scans are used to depict the enhanced turbulence detection sample portions of the entire scan which are used for turbulence detection and alerting. If an alert which inherently distracts the pilot from other activities is a selected option, in an attempt to avoid unnecessary or false alerts, it may be desirable to interrupt the azimuth scan at a single elevation and immediately backtrack to provide for enhanced turbulence detection over a relatively narrow corridor containing the projected flight path of the aircraft. This backtracking may be at the same tilt angle or a slightly adjusted tilt angle. The dimensions of the centrally disposed boxes are not intended to convey relative tilt angle adjustment magnitudes. The process is shown as starting with a first relatively high tilt angle, above the radar horizon, which represents a medium range weather scan 302, with an enhanced turbulence detection sample portion 312 disposed around the projected flight path of the aircraft. The process then drops the tilt angle to a second tilt angle which represents a long range scan 304, which contains an enhanced turbulence detection sample portion 314. The process continues dropping to the third tilt angle which represents a turbulence or overflight scan 306, which contains an enhanced turbulence detection sample portion 316. A final scan 308 is then performed, with an enhanced turbulence detection sample portion 318 therein.

It is believed that the ideal change in tilt angle between scans 312, 314, 316, and 318 is approximately one-half to one antenna beamwidth.

Prefatory to making the average velocity determinations and comparisons for each scan at each tilt angle, the multi-scan, multi-tilt angle, weather radar return processing unit 208 will need to rotate and translate the stored images to assure proper alignment during the analyzing process. The enhanced turbulence detection sample portions may be treated as independent scans for the areas at which they are directed. This rotation and translation can be done with the aid of an on-board inertial reference system, such as a gyro, airspeed indicator, altimeters, GPS, accelerometers, etc. The analyzing process can be tailored for each type of system being designed. However, in general, the average velocity, standard deviation, and wind gradient analysis would typically be implemented by a software program or hardware configuration which effectively utilizes known programming techniques.

In operation, the apparatus and method of the present invention as described in FIGS. 1, 2, and 3, could function as follows:

1. A first radar sweep is made at a first/medium range tilt angle. The tilt angle can be one that is manually selected by the pilot or one that is automatically selected by the radar or other systems on the aircraft, this sweep may or may not have a rescanned enhanced turbulence detection sample portion therein, depending upon whether the system is configured to issue a turbulence alert.

2. A first set of returns from the first radar sweep is stored in the multi-scan, multi-tilt angle, memory 206.

3. Without prompting or pilot intervention, the radar system makes a downward adjustment in the tilt angle of the antenna, and a second/long range tilt angle is thereby established.

4. A second radar sweep is made at the second tilt angle; this sweep may or may not have a rescanned enhanced turbulence detection sample portion therein, depending upon whether the system is configured to issue a turbulence alert.

5. A second set of radar returns from the second radar sweep is stored in multi-scan, multi-tilt angle, memory 206.

6. Without prompting or pilot intervention, the radar system makes another downward adjustment in the tilt angle of the antenna, and a third/turbulence/overflight tilt angle is thereby established, which is below the projected flight path of the aircraft.

7. A third radar sweep is made at the third tilt angle, this sweep may or may not have a rescanned enhanced turbulence detection sample portion therein, depending upon whether the system is configured to issue a turbulence alert.

8. Multi-scan, multi-tilt angle, weather radar return processing unit 208 is used to align the returns from the $1^{st}$, $2^{nd}$, and 3rd beams, so as to account for aircraft movement occurring during the time interval between sweeps.

9. Average wind velocity is calculated for each segment of each set of returns that is being subjected to the turbulence detection technique of the present invention.

10. The difference of average velocity between the returns is determined, and a gradient of changes in average velocity levels is created.

11. A matching of the measured gradient is made with a predetermined gradient with known vertical shear characteristics.

12. The predetermined known vertical shear from the predetermined matching gradient is subtracted from the measured returns.

13. Prior art techniques for turbulence detection and alerting are then applied to the data without the vertical shear components being present.

14. If the vertical shear components have a higher magnitude than a predetermined shear induced turbulence threshold, then a turbulence alert is issued.

It should be noted that numerous predetermined gradients can be made under controlled conditions for numerous shear magnitudes, elevations, etc. Depending on the level of discrimination desired, these predetermined gradients may be made with numerous other variables, such as weather, seasonal, and geo referenced as well; i.e., there may be a different gradient for use in locations and periods of high or low atmospheric pressure. Similarly, there may be a different profile provided for Eastern Colorado than Western Colorado. Any other variable may be used and predetermined if it results in a significant difference in amount of vertical shear present with a given velocity gradient.

Throughout this description, reference is made to on-board avionics weather radar and to pilots because it is believed that the beneficial aspects of the present invention would be most readily apparent when used by pilots in connection with on-board avionics weather radar; however, it should be understood that the present invention is not intended to be so limited and should be hereby construed to include other non-avionics and terrestrially-based weather radars, as well as radars used by persons other than pilots.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A method of detecting turbulence with a weather radar comprising the steps of:

scanning a first area using an antenna disposed at a first tilt angle;

receiving first radar returns as a result of said step of scanning a first area, said first returns having therein a first horizontal wind velocity component;

providing a computer antenna controller coupled to said antenna and automatically adjusting an orientation of said antenna to a second tilt angle;

scanning a second area using said antenna disposed at said second tilt angle;

receiving second radar returns as a result of said step of scanning a second area, said second returns having therein a second horizontal wind velocity component;

adjusting said antenna to a third tilt angle;

scanning a third area using said antenna disposed at said third tilt angle;

receiving third radar returns as a result of said step of scanning a third area, said third returns having therein a third horizontal wind velocity component;

processing said first radar returns, said second radar returns and said third radar returns and making a determination of a magnitude characteristic of a first vertical shear component, a second vertical shear component and a third vertical shear component;

removing said first vertical shear component, said second vertical shear component, and said third vertical shear component respectively from said first radar returns, said second radar returns, and said third radar returns;

making a turbulence prediction based upon said first radar returns, said second radar returns, and said third radar returns without vertical shear components therein; and, displaying an image in response to said turbulence prediction.

2. A method of claim 1 wherein said step of processing includes a translation of a scanned data set.

3. A method of claim 2 wherein said step processing includes a step of making a relative adjustment between said first radar return and said second radar returns, which results in a rotation of a scanned data set.

4. A method of claim 3 wherein said step of making a turbulence prediction comprises determining a standard deviation characteristic of said first radar returns, said second radar returns, and said third radar returns without vertical shear components therein.

5. A method of claim 4 further comprising the steps of:
providing an alert to a flight crew member when said step of making a turbulence prediction results in a determination that turbulence is detected which exceeds a predetermined threshold.

6. A method of claim 5 further comprising the steps of:
performing a focused rescanning of an area disposed about a projected flight path.

7. A method of claim 6 further comprising the steps of:
performing a fourth scan to provide an alert confirmation sample which is used to confirm an alert which would otherwise have been issued.

8. A method of claim 7 further comprising the steps of issuing a turbulence alert, when a minimum threshold of vertical shear is present in a particular area, irrespective of any determination of standard deviation of wind velocities.

9. A method of claim 1 further comprising the steps of issuing a turbulence alert, when a minimum threshold of vertical shear is present in a particular area, irrespective of any determination of standard deviation of wind velocities.

10. An apparatus for producing turbulence information comprising:
a transmitter for generating electromagnetic radiation at predetermined frequencies;
an antenna for projecting said radiation into a radar beam in a predetermined manner;
a directional controller for said antenna;
a receiver for receiving returns of radiation reflected from distant objects;
a processor for processing said returns and generating display signals;
a display for displaying said display signal generated by said receiver;
said display signals representative of returns from multiple scans of said antenna, wherein said scans have a plurality of antenna tilt angles with respect to an earth reference, the plurality of antenna tilt angles being automatically commanded and controlled by said directional controller; and,
said processor adapted with software and configured for analyzing a vertical shear component from measured wind velocities and making a turbulence prediction based upon such vertical shear component.

11. An apparatus of claim 10 wherein said software is adapted and configured for performing a statistical analysis of the spectral width of radar returns.

12. An apparatus of claim 11 further comprising an alert threshold control for controlling a threshold level above which a turbulence alert will be issued.

13. An apparatus of claim 12 wherein said directional controller is adapted and configured to provide a discontinuous scan, with increased scanning over a predetermined area.

14. An apparatus of claim 13 wherein said predetermined area is centered around a projected flight path.

15. An apparatus of claim 14 wherein said predetermined area is at a different elevation from another area of said discontinuous scan.

16. An apparatus of claim 10 wherein said receiver and said transmitter share components.

17. A weather radar comprising:
means for transmitting and receiving radar signals from an aircraft;
means for adjusting a tilt angle of said means for transmitting and receiving;
means for generating an image of weather which is based upon a plurality of antenna sweeps at different tilt angles, wherein an analysis of differences in wind velocity level statistics between sweeps is compared to a predetermined wind velocity gradient and, as a result, turbulence indicators are included in said image.

18. A weather radar of claim 17 wherein said means for generating an image uses a standard deviation of vertical shear component adjusted wind velocity to determine whether a turbulence indicator is included in said image.

19. A weather radar of claim 18 further comprising:
means for generating a turbulence alert is responsive to a condition when said standard deviation of vertical shear component adjusted wind velocity exceeds a predetermined threshold.

20. A weather radar of claim 19 wherein said means generating a turbulence alert is responsive to a determination that a magnitude of vertical shear component exceeds a predetermined threshold.

* * * * *